United States Patent
Alkalay et al.

(10) Patent No.: US 12,223,176 B1
(45) Date of Patent: Feb. 11, 2025

(54) MANAGING WEAR LEVELS OF STORAGE DEVICES

(71) Applicant: Dell Products L.P., Round Rock, TX (US)

(72) Inventors: Amitai Alkalay, Kadima (IL); Vamsi K. Vankamamidi, Hopkinton, MA (US); Lior Kamran, Richon LeZion (IL)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/526,533

(22) Filed: Dec. 1, 2023

(51) Int. Cl.
*G06F 3/00* (2006.01)
*G06F 3/06* (2006.01)

(52) U.S. Cl.
CPC .......... *G06F 3/0616* (2013.01); *G06F 3/0631* (2013.01); *G06F 3/0689* (2013.01)

(58) Field of Classification Search
CPC ..... G06F 3/0616; G06F 3/0631; G06F 3/0689
See application file for complete search history.

(56) References Cited

U.S. PATENT DOCUMENTS

| | | | |
|---|---|---|---|
| 11,163,465 B1 * | 11/2021 | Dalmatov | ............ G06F 3/0632 |
| 11,314,419 B2 | 4/2022 | Huang et al. | |
| 11,416,396 B2 | 8/2022 | Shatsky et al. | |
| 11,592,988 B2 | 2/2023 | Vankamamidi et al. | |
| 11,755,224 B2 | 9/2023 | Dalmatov | |

OTHER PUBLICATIONS

Alkalay, Amitai, et al.; "Managing Storage Extents Using Wear Levels," U.S. Appl. No. 18/526,520, filed Dec. 1, 2023.

* cited by examiner

*Primary Examiner* — Craig S Goldschmidt
(74) *Attorney, Agent, or Firm* — BainwoodHuang

(57) ABSTRACT

A technique is directed to managing wear leveling between storage devices. The technique includes generating a wear imbalance level indicating a variance between a first wear level of a first set of storage devices and a second wear level of a second set of storage devices. The technique further includes, after generating the wear imbalance level, performing a comparison operation that compares the wear imbalance level to a predefined imbalance threshold. The technique further includes, in response to the comparison operation indicating that the wear imbalance level is above the predefined imbalance threshold, providing the first set of storage devices as a first storage tier and the second set of storage devices as a second storage tier.

19 Claims, 5 Drawing Sheets

MANAGING WEAR LEVELS OF STORAGE DEVICES

BACKGROUND

Conventional data storage systems manage data on behalf of host computers. Along these lines, such data storage systems write data into and read data from groups of storage devices.

For example, a conventional data storage system may write data into and read data from log-structured storage formed from a group of solid-state drives (SSDs). If more storage capacity is needed, another group of SSDs may be added to the log-structured storage to increase total storage capacity.

SUMMARY

Unfortunately, there are deficiencies to the above-described conventional data storage system in which another group of SSDs is simply added to log-structured storage to increase the total storage capacity of the log-structured storage. For example, suppose that the above-described conventional data storage system includes 10 storage drives that become 40% worn in two years (20% per year), after which a user adds 10 new storage drives. Assuming that system usage stays the same, the storage drives would now wear down at a rate of 10% per year, as the system usage is spread between more storage drives. In this case, the 10 old storage drives reach 100% wear after six additional years, even though the new storage drives would be only 60% worn at such time. In this manner, the data storage system experiences drive failures and performance issues even though not all drives have been fully utilized.

In contrast to the above-described conventional data storage system, improved techniques are directed to providing separate storage tiers to manage wear imbalance between sets of storage devices. Along these lines, a wear imbalance level is generated indicating a variance between a first wear level of a first set of storage devices and a second wear level of a second set of storage devices. In response to the wear imbalance level being higher than a predefined imbalance threshold, the first set of storage devices and the second set of storage devices are provided as separate storage tiers. Write data is directed to specific storage tiers to manage wear levels between the storage devices.

One embodiment is directed to a method of managing storage devices. The method includes generating a wear imbalance level indicating a variance between a first wear level of a first set of storage devices and a second wear level of a second set of storage devices. The first set of storage devices is different from the second set of storage devices. The method further includes, after generating the wear imbalance level, performing a comparison operation that compares the wear imbalance level to a predefined imbalance threshold. The method further includes, in response to the comparison operation indicating that the wear imbalance level is above the predefined imbalance threshold, providing the first set of storage devices as a first storage tier and the second set of storage devices as a second storage tier.

Another embodiment is directed to an electronic environment that includes memory and control circuitry coupled with the memory. The memory stores instructions that, when carried out by the control circuitry, cause the control circuitry to perform a method of managing storage devices, the method including:

(A) generating a wear imbalance level indicating a variance between a first wear level of a first set of storage devices and a second wear level of a second set of storage devices, the first set of storage devices being different from the second set of storage devices;

(B) after generating the wear imbalance level, performing a comparison operation that compares the wear imbalance level to a predefined imbalance threshold; and (C) in response to the comparison operation indicating that the wear imbalance level is above the predefined imbalance threshold, providing the first set of storage devices as a first storage tier and the second set of storage devices as a second storage tier.

Yet another embodiment is directed to a computer program product having a non-transitory computer readable medium that stores a set of instructions to manage storage devices, the set of instructions, when carried out by computerized circuitry, causes the computerized circuitry to perform a method of:

(A) generating a wear imbalance level indicating a variance between a first wear level of a first set of storage devices and a second wear level of a second set of storage devices, the first set of storage devices being different from the second set of storage devices;

(B) after generating the wear imbalance level, performing a comparison operation that compares the wear imbalance level to a predefined imbalance threshold; and (C) in response to the comparison operation indicating that the wear imbalance level is above the predefined imbalance threshold, providing the first set of storage devices as a first storage tier and the second set of storage devices as a second storage tier.

In some arrangements, the method further includes, in response to the first wear level of the first set of storage devices being higher than the second wear level of the second set of storage devices, directing write data to the second storage tier to manage wear leveling between the first set of storage devices and the second set of storage devices.

In some arrangements, the method further includes, in response to a write rate to the second storage tier reaching a predefined write bandwidth threshold, directing at least a portion of additional write data to the first storage tier to provide additional write bandwidth when writing to the storage devices.

In some arrangements, the method further includes performing garbage collection that consolidates valid data stored in the second set of storage devices. Additionally, the method further includes, in response to efficiency of the garbage collection falling below a predefined efficiency threshold, moving data from the second storage tier to the first storage tier to provide additional storage space in the second storage tier.

In some arrangements, the first set of storage devices is configured as a first redundant array of independent disks (RAID). Additionally, the method further includes receiving a signal indicating that the second set of storage devices includes a number of storage devices greater than or equal to a predefined minimum RAID-width threshold. Further, providing the second set of storage devices as the second storage tier includes, in response to receiving the signal indicating that the second set of storage devices includes a number of storage devices greater than or equal to a predefined minimum RAID-width threshold, configuring the second set of storage devices as a second RAID.

In some arrangements, the method further includes, in response to the wear imbalance level falling below a predefined merging threshold, merging the first storage tier and the second storage tier by providing both the first set of storage devices and the second set of storage devices as a single storage tier.

In some arrangements, merging the first storage tier and the second storage tier includes performing a striping operation that forms RAID stripes from storage devices of both the first set of storage devices and the second set of storage devices.

In some arrangements, performing the striping operation includes provisioning the RAID stripes to have respective RAID widths larger than both a first number of storage devices in the first set of storage devices and a second number of storage devices in the second set of storage devices.

In some arrangements, generating the wear imbalance level includes:
(A) providing the first wear level by averaging first proportions of respective numbers of consumed program/erase (P/E) cycles of the first set of storage devices to respective total estimated numbers of P/E cycles of the first set of storage devices;
(B) providing the second wear level by averaging second proportions of respective numbers of consumed P/E cycles of the second set of storage devices to respective total estimated numbers of P/E cycles of the second set of storage devices; and
(C) providing, as the wear imbalance level, a difference between the first wear level and the second wear level.

In some arrangements, the method further includes, while operating the first set of storage devices, receiving an expansion instruction to utilize the second set of storage devices. Further, providing the first set of storage devices as the first storage tier and the second set of storage devices as the second storage tier includes configuring the second set of storage devices to provide storage space to perform data storage operations together with the first set of storage devices.

This Summary is provided merely for purposes of summarizing some example embodiments so as to provide a basic understanding of some aspects of the disclosure. Accordingly, it will be appreciated that the above-described example embodiments are merely examples and should not be construed to narrow the scope or spirit of the disclosure in any way. Other embodiments, aspects, and advantages will become apparent from the following detailed description taken in conjunction with the accompanying drawings which illustrate, by way of example, the principles of the described embodiments.

BRIEF DESCRIPTION OF THE SEVERAL VIEWS OF THE DRAWINGS

The foregoing and other features and advantages will be apparent from the following description of particular embodiments, as illustrated in the accompanying drawings, in which like reference characters refer to the same or similar parts throughout the different views. The drawings are not necessarily to scale, emphasis instead being placed upon illustrating the principles of various embodiments.

DETAILED DESCRIPTION

An improved technique is directed to providing separate storage tiers to manage wear imbalance between sets of storage devices. Along these lines, respective wear levels of a first set of storage devices and a second set of storage devices are used to generate a wear imbalance level. In response to the wear imbalance level being higher than a predefined imbalance threshold, the first set of storage devices and the second set of storage devices are provided as separate storage tiers. Write data is directed to a specific storage tier to manage wear levels between the storage devices.

The various individual features of the particular arrangements, configurations, and embodiments disclosed herein can be combined in any desired manner that makes technological sense. Additionally, such features are hereby combined in this manner to form all possible combinations, variants and permutations except to the extent that such combinations, variants and/or permutations have been expressly excluded or are impractical. Support for such combinations, variants and permutations is considered to exist in this document.

Figure 1:
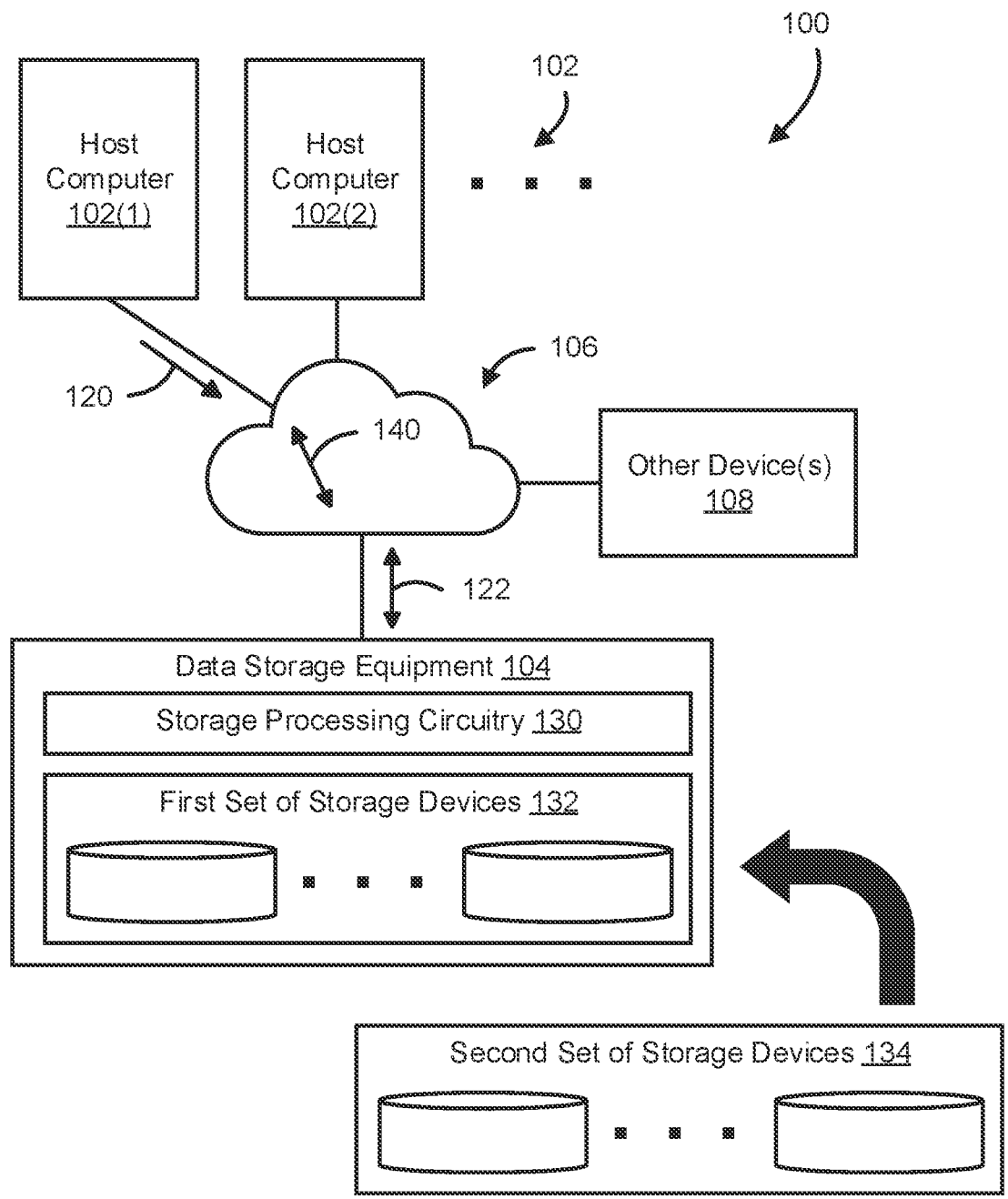
FIG. 1 is a block diagram of an example environment in accordance with certain embodiments.

FIG. 1 shows an example electronic environment 100 that provides storage device management in accordance with certain embodiments. The electronic environment 100 includes host computers 102(1), 102(2), . . . (collectively, host computers 102), data storage equipment 104, a communications medium 106, and optionally other devices 108.

Each of the host computers 102 is constructed and arranged to perform useful work. In some embodiments, one or more of the host computers 102 operate as a file server, a web server, an email server, an enterprise server, a database server, a transaction server, combinations thereof, etc. which provide host input/output (I/O) requests 120 to the data storage equipment 104. In some embodiments, the host computers 102 provide a variety of different host I/O requests 120 (e.g., block and/or file-based write commands, block and/or file-based read commands, combinations thereof, etc.) that direct the data storage equipment 104 to richly and reliably store host data 122 within and retrieve the host data 122 from storage (e.g., primary storage or main memory, secondary storage, tiered storage, combinations thereof, etc.).

The data storage equipment 104 (e.g., a storage array, a storage system, etc.) includes storage processing circuitry 130 and a first set of storage devices 132. In some embodiments, the data storage equipment 104 utilizes additional storage devices to increase storage capacity. For example, as shown in FIG. 1, the storage processing circuitry 130 performs an expansion operation that incorporates a second set of storage devices 134 into the data storage equipment 104.

The storage processing circuitry 130 is constructed and arranged to respond to the host I/O requests 120 from the host computers 102 by writing data into and reading the data from the first set of storage devices 132 and the second set of storage devices 134. In some embodiments, the storage processing circuitry 130 includes one or more physical storage processors (SPs) or engines, data movers, director boards, blades, I/O modules, storage device controllers, switches, other hardware, combinations thereof, and so on.

The first set of storage devices 132 and the second set of storage devices 134 provide persistent/non-volatile storage in accordance with one or more RAID data protection schemes. In some embodiments, the first set of storage devices 132 and the second set of storage devices 134 include one or more types of storage drives, e.g., non-volatile random access memory (NVRAM) devices, solid state drives (SSDs), hard disk drives (HDDs), combinations thereof, and so on. In some embodiments, at least some of the first set of storage devices 132 and/or the second set of storage devices 134 provide non-volatile storage using a mapped-RAID architecture. Moreover, in accordance with certain embodiments, various physical componentry may be virtualized for additional flexibility, fault tolerance, load balancing, and so on (e.g., virtual data movers, virtual storage devices, etc.).

In some embodiments, the storage processing circuitry 130 writes data to and read data from storage locations in the first set of storage devices 132 and the second set of storage devices 134. For example, in some embodiments, the storage processing circuitry 130 writes data in "erase blocks" having a fixed size (e.g., 4 KB, 8 KB, 16 KB, etc.).

Further, in some embodiments, each storage location in the first set of storage devices 132 and the second set of storage devices 134 is constructed and arranged to withstand a respective number of program/erase (P/E) cycles in which the storage processing circuitry 130 writes data to and erases data from the storage location (e.g., 2,000 cycles, 10,000 cycles, etc.). In some embodiments, the first set of storage devices 132 and the second set of storage devices 134 record a number of consumed P/E cycles for each storage location. In some embodiments, the first set of storage devices 132 and the second set of storage devices 134 records an average wear level indicating an average amount of consumed P/E cycles to a total number of P/E cycles that the storage locations are expected to withstand.

The communications medium 106 is constructed and arranged to connect the various components of the electronic environment 100 together to enable these components to exchange electronic signals 140 (e.g., see the double arrow 140). At least a portion of the communications medium 106 is illustrated as a cloud to indicate that the communications medium 106 is capable of having a variety of different topologies including backbone, hub and spoke, loop, irregular, combinations thereof, and so on. Along these lines, the communications medium 106 may include copper-based data communications devices and cabling, fiber optic devices and cabling, wireless devices, combinations thereof, etc. Furthermore, the communications medium 106 is capable of supporting LAN-based communications, SAN-based communications, cellular communications, WAN-based communications, distributed infrastructure communications, other topologies, combinations thereof, etc.

The other devices 108 represent other possible componentry of the electronic environment 100. Along these lines, the other devices 108 may include remote data storage equipment that provides data to and/or receives data from the data storage equipment 104 (e.g., replication arrays, backup and/or archiving equipment, service processors and/or management/control devices, combinations thereof, etc.).

During operation and as will be explained in further detail shortly, the storage processing circuitry 130 receives a signal that the second set of storage devices 134 have been added to the electronic environment 100. In response to receiving the signal, the storage processing circuitry 130 queries the first set of storage devices 132 and the second set of storage devices 134 to generate respective average wear levels of the sets of storage devices. The storage processing circuitry 130 then uses the average wear levels to generate a wear imbalance level indicating a variance between the first set of storage devices and the second set of storage devices. In response to the wear imbalance level being above a predefined imbalance threshold, the storage processing circuitry configures the first set of storage devices 132 as a first storage tier and the second set of storage devices 134 as a second storage tier. The storage processing circuitry 130 then stores data in specific storage tiers to manage wear leveling between the first storage tier and the second storage tier.

Advantageously, managing wear leveling when there is a wear imbalance between storage devices enables an increase in time before experiencing performance issues or drives failure. For example, by storing proportionally more data in the second set of storage devices 134, the storage processing circuitry 130 enhances the functional lifetime of the first set of storage devices 132. In this manner, the first set of storage devices 132 are less prone to failure. Further details will now be provided with reference to FIG. 2.

Figure 2:
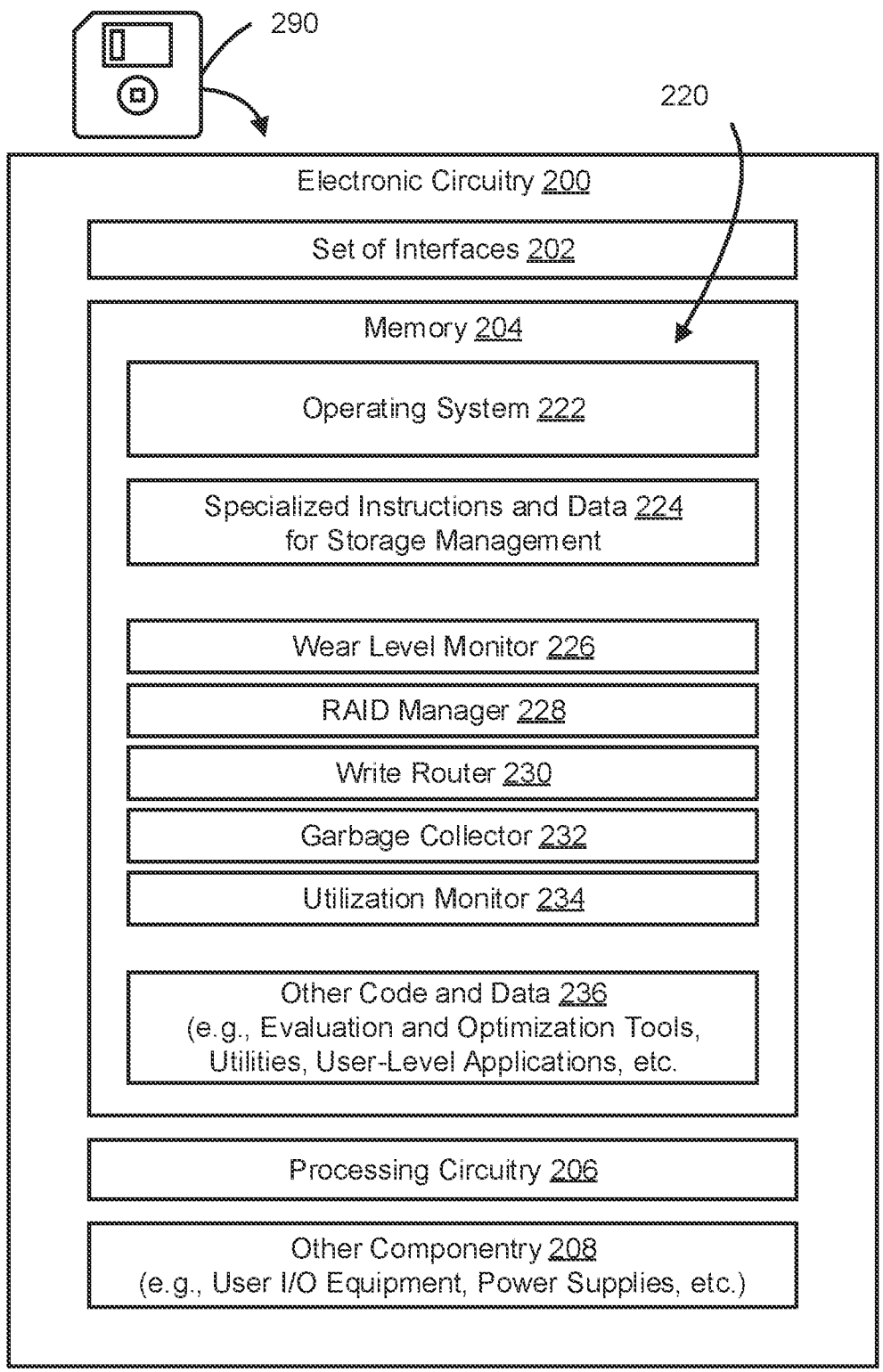
FIG. 2 is a block diagram of electronic circuitry in accordance with certain embodiments.

FIG. 2 is a block diagram of electronic circuitry 200 which is suitable for at least a portion of the data storage equipment 104 (FIG. 1) in accordance with certain embodiments. The electronic circuitry 200 includes a set of interfaces 202, memory 204, processing circuitry 206, and other componentry 208.

The set of interfaces 202 is constructed and arranged to connect the electronic circuitry 200 to the communications medium 106 to enable communications with other devices in the electronic environment 100 (e.g., the host computers 102). In some embodiments, the communications are IP-based, SAN-based, cellular-based, cable-based, fiber-optic-based, wireless, cloud-based, combinations thereof, etc. Additionally, the set of interfaces 202 is constructed and arranged to connect the electronic circuitry 200 to other local equipment such as the first set of storage devices 132 and the second set of storage devices 134. In some embodiments, the set of interfaces 202 includes one or more host interfaces (e.g., a computer network interface, a fibre-channel interface, etc.), one or more storage device interfaces (e.g., a host adapter or HBA, etc.), and other interfaces. As a result, the set of interfaces 202 enables the electronic circuitry 200 to robustly and reliably communicate with various apparatus.

The memory 204 includes both volatile storage (e.g., DRAM, SRAM, etc.) and non-volatile storage (e.g., flash memory, magnetic memory, etc.). The memory 204 stores a variety of software constructs 220 including an operating system 222, specialized instructions and data 224, a wear level monitor 226, a RAID manager 228, a write router 230, a garbage collector 232, a utilization monitor 234, and other code and data 236.

The operating system 222 refers to particular control code such as a kernel to manage computerized resources (e.g., processor cycles, memory space, etc.), the I/O stack (e.g., drivers), and so on. The specialized instructions and data 224 refer to particular instructions for storage management. In some arrangements, the specialized instructions and data 224 are tightly integrated with or part of the operating system 222 itself.

The wear level monitor 226 is constructed and arranged to query the first set of storage devices 132 and the second set of storage devices 134 to track respective wear levels of storage locations in the data storage equipment 104. In some embodiments, the wear level monitor 226 is further constructed and arranged to generate a wear imbalance level between the first set of storage devices 132 and the second set of storage devices 134.

The RAID manager 228 is constructed and arranged to manage the first set of storage devices 132 and the second set of storage devices 134 to provide redundant storage protection for stored data. In some embodiments, the RAID manager 228 is constructed and arranged to provide the first set of storage devices 132 as a first storage tier and the second set of storage devices 134 as a second storage tier. In some embodiments, the RAID manager 228 provides the redundant storage protection by providing a set of RAID stripes across multiple storage devices. In some embodiments, each RAID stripe includes a set of data sections and a set of parity sections according to a predefined RAID configuration (e.g., RAID 5, RAID 6, combinations thereof, etc.). In some embodiments, the RAID manager 228 is further constructed and arranged to perform a striping operation that provides RAID stripes that use the same or different storage devices.

The write router 230 is constructed and arranged to direct write data (e.g., the host data 122, data from the garbage collector 232, combinations thereof, etc.) to the first set of storage devices 132 and the second set of storage devices 134. In some embodiments, the write router 230 directs the write data to the set of storage devices with the least amount of wear. In some embodiments, the write router 230 is further constructed and arranged to monitor respective write rates to the storage tiers. Along these lines, in response to the write router 230 detecting that the write rate to a particular storage tier reaches a predefined write bandwidth threshold, the write router 230 is configured to direct at least part of the write data to another storage tier to maintain write performance.

The garbage collector 232 is constructed and arranged to perform garbage collection on the first set of storage devices 132 and the second set of storage devices 134. Along these lines, the garbage collector 232 performs garbage collection by identifying storage locations (e.g., blocks) that are partially filled with valid data, directing the valid data to be written into a new storage location, and indicating the old storage locations as invalid. In some embodiments, the garbage collector 232 is further constructed and arranged to record garbage collection efficiency, e.g., an average number of blocks made available in a set of garbage collection cycles.

The utilization monitor 234 is constructed and arranged to query the storage devices to generate respective utilization levels of the storage tiers. In some embodiments, the utilization monitor 234 is further constructed and arranged to direct data to be moved between storage tiers, e.g., in response to detecting that garbage collection efficiency has fallen below a predefined efficiency threshold.

The other code and data 236 include applications and routines to provide additional operations and services (e.g., performance measurement tools, etc.), user-level applications, administrative tools, utilities, and so on.

During operation, the wear level monitor 226 performs a comparison operation that compares a first wear level of the first set of storage devices 132 and a second wear level of a second set of storage devices 134. Upon detecting a wear level imbalance above a predefined imbalance threshold, the RAID manager 228 provides the first set of storage devices 132 as a first storage tier and the second set of storage devices 134 as a second storage tier. Thereafter, the write router 228 directs write data to be stored in specific storage tiers to manage wear leveling of the storage devices. In some embodiments, the write router 228 directs write data to the least worn storage tier unless a write rate to the storage tier reaches a write bandwidth threshold.

Moreover, during operation, the garbage collector 232 functions to consolidate valid data in the storage tiers. In some embodiments, most write data is written to the least worn storage tier and, as a result, the garbage collector 232 collects valid data more often from the least worn storage tier than the other storage tier. In some embodiments, the utilization monitor 234 directs data to be removed from the least worn storage tier and placed in the other storage tier. For example, in some embodiments, the utilization monitor 234 moves cold data from the second storage tier to the first storage tier. In this manner, the utilization monitor 234 configures the second storage tier to store hot data that is replaced more often than cold data, creating more opportunities for the garbage collector 232 to free blocks from the second storage tier when performing garbage collection. Further details will now be provided with reference to FIG. 3.

Figure 3:
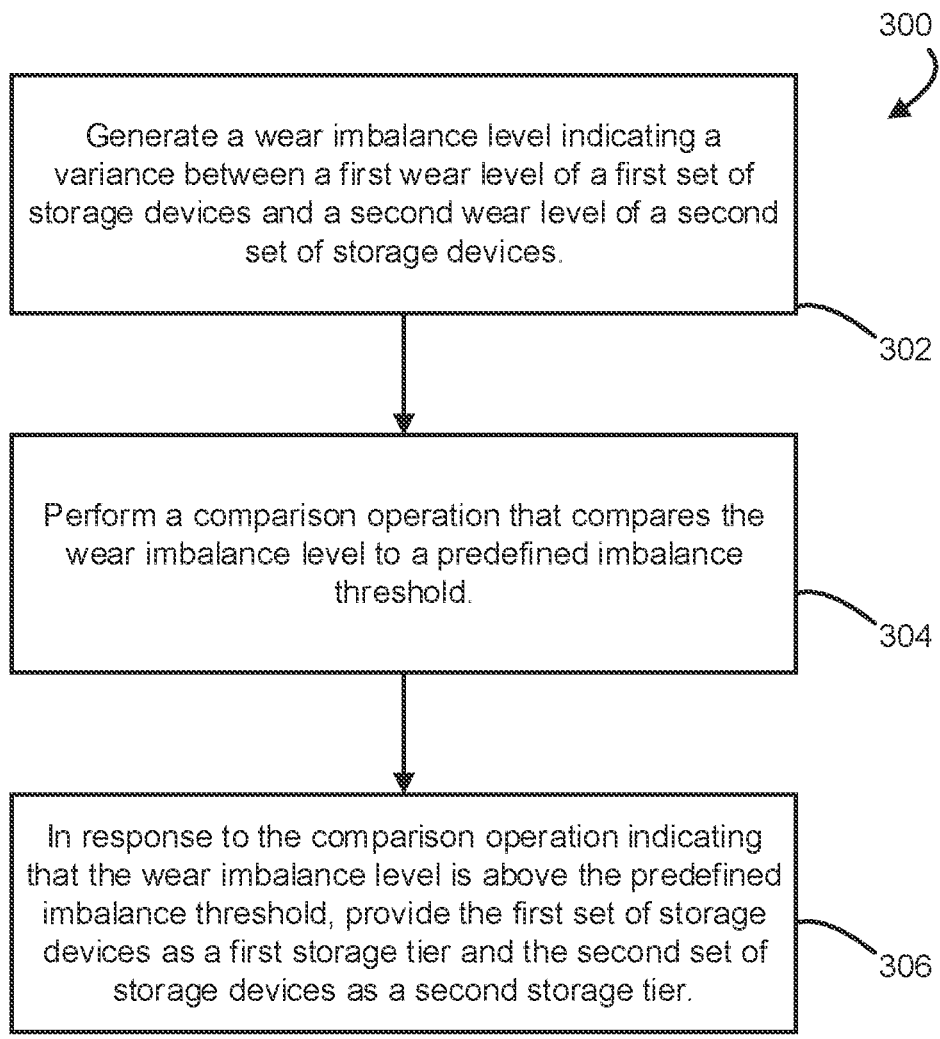
FIG. 3 is a flowchart of a procedure that is performed by specialized equipment in accordance with certain embodiments.

FIG. 3 is a flowchart of a procedure 300 which is performed by specialized equipment in accordance with certain embodiments. The procedure 300 carries out storage device management of the first set of storage devices 132 and the second set of storage devices 134.

At 302, the wear level monitor 226 generates a wear imbalance level indicating a variance between a first wear level of a first set of storage devices and a second wear level of a second set of storage devices. In some embodiments, the wear level monitor 226 queries the first set of storage devices 132 to obtain a first wear level of the first set of storage devices 132. Similarly, the wear level monitor 226 queries the second set of storage devices 134 to obtain a second wear level of the second set of storage devices 134. The wear level monitor 226 then generates the wear imbalance level by taking a difference between the first wear level and the second wear level.

In some embodiments, the first wear level and the second wear level are averages wear levels of the respective sets of storage devices. In some embodiments, the wear levels are a proportion of consumed P/E cycles to total expected P/E cycles. For example, suppose that the first set of storage devices 132 is 40% worn and the second set of storage devices 134 is 2% worn. In this example, the wear imbalance level is 38% (40% minus 2%).

At 304, the wear level monitor 226 performs a comparison operation that compares the wear imbalance level to a predefined imbalance threshold. In some embodiments, the predefined imbalance threshold is a fixed number (e.g., 2%, 10%, and so forth). In other embodiments, the predefined imbalance threshold is adjusted dynamically.

At 306, in response to the comparison operation indicating that the wear imbalance level is above the predefined imbalance threshold, the RAID manager 228 provides the first set of storage devices 132 as a first storage tier and the second set of storage devices 134 as a second storage tier. In this manner, write operations are directed to a specific storage tier (e.g., the storage tier with the least amount of wear) to manage wear leveling between the storage tiers.

In some embodiments, the RAID manager 228 configures the second set of storage devices 134 as a RAID, e.g., the RAID manager 228 performs a striping operation on the second set of storage devices 134 to create RAID slices that provide redundant storage protection for data stored in the second set of storage devices 134. In some embodiments, the first set of storage devices 132 is already in use when the second set of storage devices 134 is added (e.g., the first set of storage devices 132 is already configured as a first RAID 6(4±2)). In these embodiments, the RAID manager 228 creates new RAID stripes only on the second set of storage devices 134 (e.g., a second RAID 6(4+2). However, in other embodiments, the first set of storage devices 132 is configured as a RAID simultaneously with the second set of storage devices 134.

In some embodiments, prior to providing the second set of storage devices 134 as a second tier, the RAID manager 228 receives a signal indicating that the second set of storage devices 134 includes a number of storage devices greater than or equal to a predefined minimum RAID-width threshold. In some embodiments, the minimum RAID-width threshold is fixed number of storage devices indicating a number of storage devices needed to form a minimum RAID scheme (e.g., RAID 6(4+2), RAID 6(10+2), combinations thereof, etc.). In this manner, the RAID manager 228 configures the second set of storage devices 134 with sufficient storage capacity for storing host data. Further details will now be provided with reference to FIG. 4.

Figure 4:
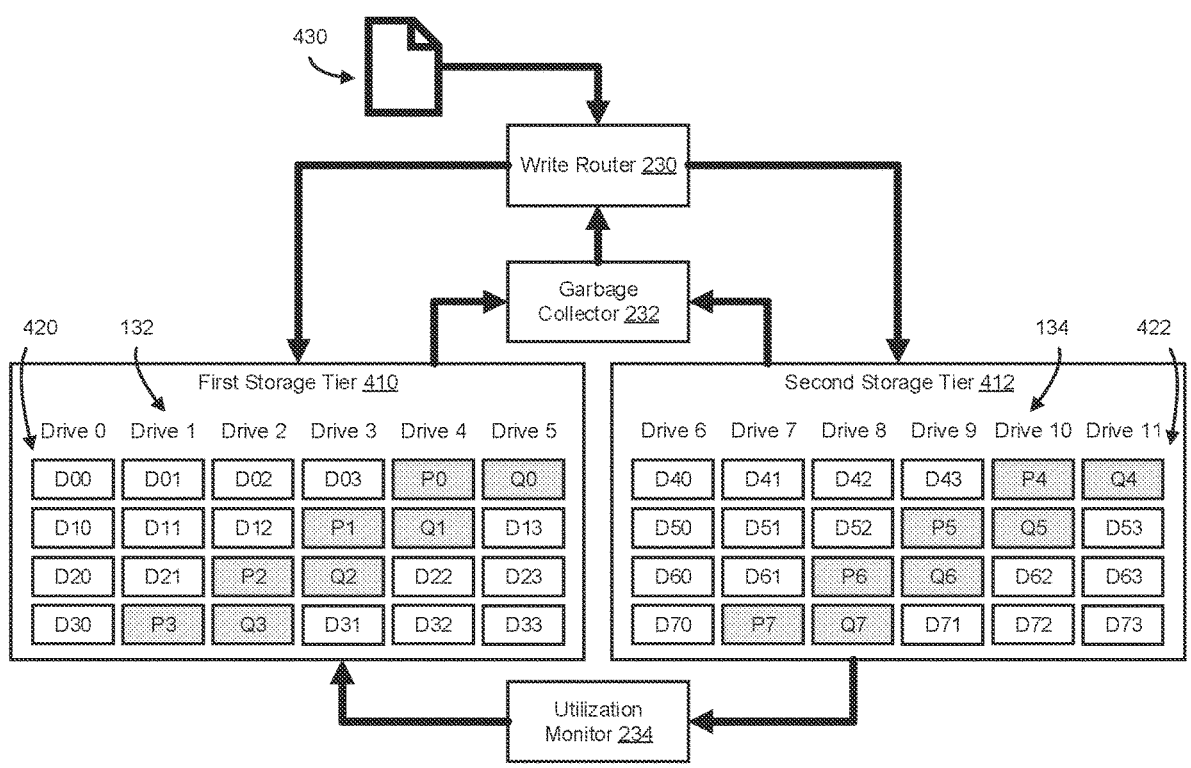
FIG. 4 is a block diagram illustrating data management across multiple storage tiers in accordance with certain embodiments.

FIG. 4 is a block diagram illustrating storage management in a first storage tier 410 and a second storage tier 412. As shown, the first storage tier 410 includes the first set of storage devices 132 configured as a RAID 6(4+2) with a first set of RAID stripes 420. Likewise, the second storage tier 412 includes the second set of storage devices 134 configured a RAID 6(4+2) with a second set of RAID stripes 422. The first storage tier 410 and the second storage tier 412 are communicatively connected with the write router 230, the garbage collector 232, and the utilization monitor 234.

As shown, the first set of RAID stripes 420 and the second set of RAID stripes 422 include data sections denoted using the format Dij, where i indicates stripe number and j indicates individual data sections within the stripe. Further, the first set of RAID stripes 420 and the second set of RAID stripes 422 include parity sections denoted using the format Pi and Qi, where i indicates stripe number.

As shown, the first set of storage devices 132 and the second set of storage devices 134 are configured as RAID 6(4+2) including four data sections and two parity sections per RAID stripe. However, it should be understood that FIG. 4 is provided for example purposes and, in some embodiments, the first storage tier 410 and the second storage tier 412 have different RAID configurations (e.g., RAID 1, RAID 5, RAID 10, combinations thereof, etc.), more or fewer data and/or parity sections, more or fewer storage devices, more or fewer RAID stripes, combinations thereof, and so forth. Moreover, although FIG. 4 shows RAID stripes that span every storage device in the first set of storage devices 132, it should be understood that, in some embodiments, the first set of RAID stripes 420 includes RAID stripes that span fewer than all storage devices in the first set of storage devices 132. Likewise, in some embodiments, the second set of RAID stripes 422 includes RAID stripes that span fewer than all storage devices in the second set of storage devices 134.

During operation, the write router 230 receives an instruction to store write data 430. In some embodiments, the write data 430 is flushed from a cache. In response, the write router 230 directs the write data 430 to one of the first storage tier 410 and the second storage tier 412. In some embodiments, the write router 230 directs the write data 430 to the least worn storage tier (e.g., the second storage tier 412). However, in some embodiments, when the write rate to the least worn storage tier reaches a predefined write bandwidth threshold, the write router 230 instead directs the write data 430 to the other storage tier (e.g., the first storage tier 410). In this manner, the write router 230 manages wear leveling between the first storage tier 410 and the second storage tier 412 while maintaining write rate performance.

In some embodiments, the predefined write bandwidth threshold is a fixed value (e.g., 5,000 input/output operations per second (IOPS), 10,000 IOPS, etc.). In some embodiments, the predefined write bandwidth is dynamically adjusted.

During operation, the garbage collector 232 consolidates valid data stored in the first storage tier 410 and the second storage tier 412 through garbage collection. In some embodiments, the write router 230 directs the consolidated data similarly to the write data 430 as described above.

In some embodiments, the utilization monitor 234 queries the storage devices to generate a utilization level of the storage tiers. Along these lines, when garbage collection efficiency falls below a predefined efficiency threshold (e.g., when a garbage collection cycle frees number of blocks below a preset number), the utilization monitor 234 directs data transfer between the storage tiers.

In some embodiments, the utilization monitor 234 improves garbage collection efficiency by directing cold data to be moved from the least worn storage tier to the other storage tier (e.g., the second storage tier 412 to the first storage tier 410, as shown in FIG. 4). In these embodiments, the write router 230 directs most data to the least worn storage tier, and garbage collection mainly occurs on the least worn storage tier. In these embodiments, by moving cold data out of the least worn storage tier, the least worn storage tier is available to store hotter data that is more quickly replaced, creating sections of invalid data to be removed through garbage collection. In this manner, garbage collection creates a higher proportion of freed blocks in each garbage collection cycle. Further details will now be provided with reference to FIG. 5.

Figure 5:
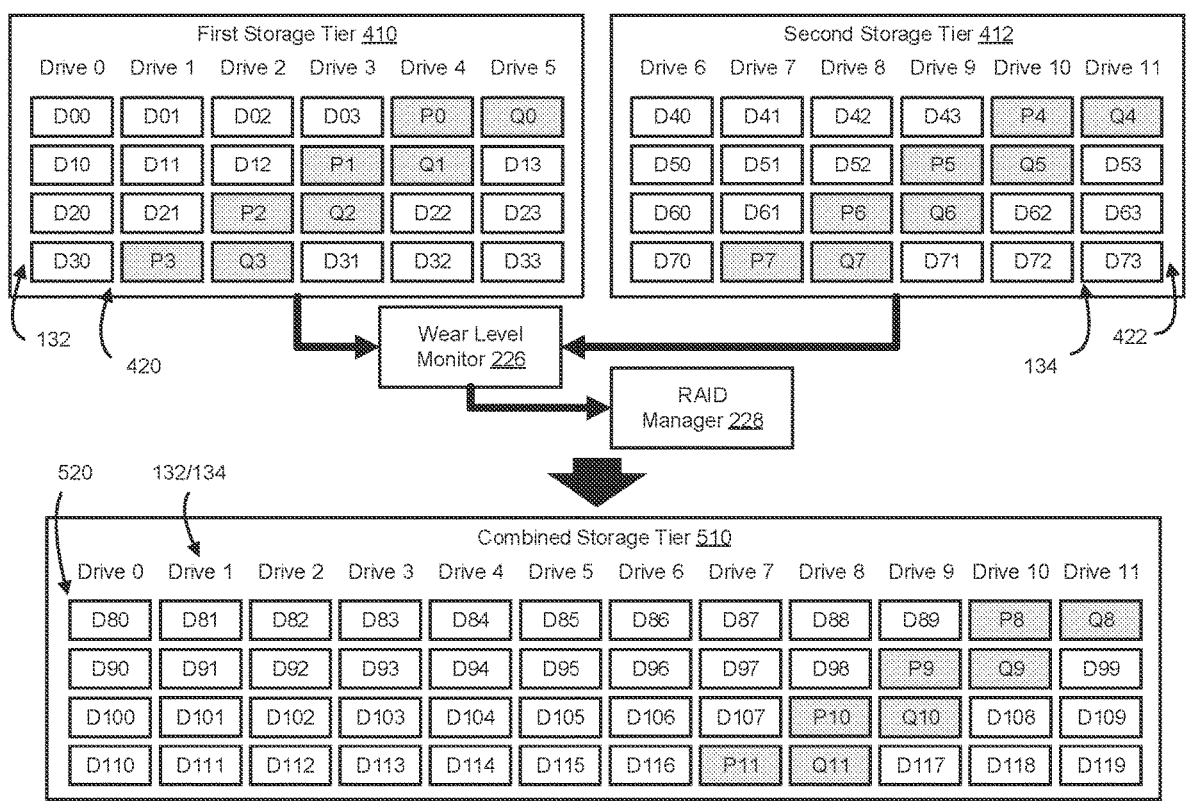
FIG. 5 is a block diagram illustrating a merging operation that combines multiple storage tiers in accordance with certain embodiments.

FIG. 5 is a block diagram of a merging operation that merges the first storage tier 410 and the second storage tier 412 into a combined storage tier 510. Along these lines, the wear level monitor 226 queries the first set of storage devices 132 and the second set of storage devices 134 to generate a wear imbalance level. When the wear level imbalance falls below a predefined merging threshold, the wear level monitor 226 directs the RAID manager 228 to merge the first storage tier 410 and the second storage tier 412 into the combined storage tier 510.

In some embodiments, the RAID manager 228 performs a striping operation to form RAID stripes 520 using both the first set of storage devices 132 and the second set of storage devices 134. In some embodiments, the RAID manager 228 provisions the RAID stripes 520 to have respective RAID widths (e.g., a number of storage devices used to form a RAID stripe) that are larger than the first set of storage devices 132 and the second set of storage devices 134. For example, as shown, the RAID stripes 520 have a RAID width of 12, which is larger than the number of storage devices in the first set of storage devices 132 (6 storage devices) and larger than the number of storage devices in the second set of storage devices 134 (likewise, 6 storage devices). Advantageously, by using more storage devices, each of the RAID stripes 520 is configured to store a higher proportion of host data than a RAID stripe with the same RAID level using fewer storage devices (e.g., a RAID 6(10+2) stores proportionally more host data than a RAID 6(4+2)).

As shown, the RAID stripes 520 are configured as RAID 6(10+2) including ten data sections and two parity sections per RAID stripe. However, it should be understood that FIG. 5 is provided for example purposes and, in some embodiments, the combined storage tier 510 has a different RAID configuration (e.g., RAID 1, RAID 5, RAID 10, combinations thereof, etc.), more or fewer data and/or parity sections, more or fewer storage devices, more or fewer RAID stripes, combinations thereof, and so forth. Moreover, although FIG. 5 shows RAID stripes that span every storage device in the first set of storage devices 132 and the second set of storage devices 134, it should be understood that, in some embodiments, the RAID stripes 520 includes RAID stripes that span fewer than all storage devices.

As described above, improved techniques are directed to providing separate storage tiers to manage wear imbalance between sets of storage devices. Along these lines, respective wear levels of a first set of storage devices and a second set of storage devices are used to generate a wear imbalance level. In response to the wear imbalance level being higher than a predefined imbalance threshold, the first set of storage devices and the second set of storage devices are provided as separate storage tiers. Write data is directed to a specific storage tier to manage wear levels between the storage devices.

One should appreciate that the above-described techniques do not merely collect and store data. Rather, the disclosed techniques include providing sets of storage devices as storage tiers to store write data. Accordingly, such techniques enable wear level management of the sets of storage devices.

While various embodiments of the present disclosure have been particularly shown and described, it will be understood by those skilled in the art that various changes in form and details may be made therein without departing from the spirit and scope of the present disclosure as defined by the appended claims.

For example, it should be understood that various components of the example environment 100 such as the data storage equipment 106, etc. are capable of being implemented in or "moved to" the cloud, i.e., to remote computer resources distributed over a network. Here, the various computer resources may be distributed tightly (e.g., a data storage system in a single facility) or over relatively large distances (e.g., over a campus, in different cities, coast to coast, etc.). In these situations, the network connecting the resources is capable of having a variety of different topologies including backbone, hub and spoke, loop, irregular, combinations thereof, and so on. Additionally, the network may include copper-based data communications devices and cabling, fiber optic devices and cabling, wireless devices, combinations thereof, etc. Furthermore, the network is capable of supporting LAN-based communications, SAN based communications, combinations thereof, and so on.

Some embodiments are composed of storage nodes which consists of CPU, memory and a disk array enclosure (DAE) with SSD drives as the backend. Some embodiments use a RAID 5 or RAID 6 parity protection scheme to store the user data. In these embodiments, the RAID is organized in grids of fixed size blocks, with R rows and K+1 (RAID 5) or K+2 (RAID 6) columns called UBERs. Each column is a separate physical drive, and one (RAID 5) or two (RAID 6) columns are designated as parity. For RAID 6, for example, each UBER is constructed with a subset of K+2 drives (out of total N drives in the DAE); different UBERs may have different K+2 drives. As shown in FIG. 4, each of the first set of storage devices 132 and the second set of storage devices 134 is organized as an UBER with 4+2 (K=4) drives.

In some embodiments, each line in an UBER is a physical large block (PLB) that contains 2 MB of compressed data. The 2 MB of compressed data is split between four drives (e.g., Drives 0-3), each storing 512 KB of the compressed data, and each parity drive stores 512 KB of parity, which means each line stores a total of 3 MB.

In some embodiments, each UBER contains fixed capacity (e.g., 64 GB) of user data (excluding parity), and is constructed with fixed size slices from different storage devices (e.g., 4 GB). Referring to the above example, an UBER with 4+2 (K=4) drives will have 4 slices on each drive (4 slices of 4 GB×4 data drives=4×4×4=64 GB of user data), while the total UBER capacity is 96 GB (including 2 parity drives).

Some embodiments use log-structured writes for the user data and stores write data in full PLB increments. When a data block within an existing PLB is overwritten, the new (compressed) data will be written (together with more new data) to a new (empty) PLB. In some embodiments, the existing PLB which held the old data is not modified at this time—the updated block is only marked as invalidated.

Some embodiments use a Garbage Collection (GC) process which merges partially utilized PLBs and writes them to a new PLB, freeing the old PLBs. As a result, the free PLBs are randomly spread in the drives, and therefore the storage system randomly writes to the SSDs.

In some embodiments, data is written to the SSDs in "erase block" units, which are completely erased before they are rewritten. The SSD supports a limited number of Program/Erase (P/E) cycles for each erase block. Therefore, the SSD has a limited lifetime, and its wear level increases with writes. The SSD wear is especially significant with quad-level cell (QLC) drives, in which the number of P/E cycles are much more limited than triple-level cell (TLC) drives.

Some embodiments support a scale-up by adding new SSD drives to the DAE. Following a scale-up, these embodiments "restripe" the UBERs to also include the new drives, as if the UBER was initially started with both the old drives and the new drives. Subsequently, there is a wear-level imbalance between the old drives and the new drives.

It should be understood that operating the old drives and the new drives without managing the wear level between the drives leads to a shorter actual lifetime of the old drives, compared to a system that initially started with both the old and new drives. Further, the wear-level imbalance may cause additional problems if drives that are nearly worn out have more errors or performance impact. As mentioned above, the imbalance is more significant with QLC drives which wear out faster.

For example, consider a conventional data storage system that runs for 2 years with 10 SSDs that become 40% worn, and the system is scaled-up with 10 new drives. Assuming that system usage stays the same, the storage drives would now wear down at a rate a 10% per year, as the usage is spread between more storage drives. Thus, the old drives will wear out after an additional 6 years (8 years in total). However, if the data storage system was initially started with 20 drives, the lifetime would have had a longer expected lifetime of 10 years.

Some embodiments create a separate tier that includes only the new drives, prioritize writes to the new tier until a predefined wear-level differentiation is achieved, and then merge the two tiers. After merging the two tiers, certain embodiments also use a larger RAID width (i.e., the number of drives that compose an UBER), to gain additional capacity. These certain embodiments proceed as follows:

(1) Following a scale-up, the certain embodiments calculate the average wear level of the existing drives. In these embodiments, if the average wear level is below a predefined threshold, the drives are added without balancing the wear level.

(2) If a number of new drives added on scale-up are sufficient to form a minimal RAID scheme (e.g., 4+2), the certain embodiments create a new RAID tier (hereinafter, "Tier B"), which forms a separate Raid Resiliency Set (RRS), and creates UBERs within the new tier. The tier with the old drives will be referred to as "Tier A."

(3) In some embodiments, a write router component chooses the destination tier for new writes coming from "flush," as well as GC writes. The write router component monitors the write bandwidth to each of the tiers.

(4) As long as the system is not limited by the backend (e.g., when the backend write bandwidth is below a predefined threshold), the certain embodiments use the write router component to direct writes to Tier B.

(5) When the backend bandwidth crosses the predefined threshold, the write router component starts directing writes also to tier A, e.g., to avoid performance impact.

(6) In some embodiments, writing only to the new Tier B fills it up. To ensure GC efficiency, the certain embodiments maintain the utilization of Tier B at a certain utilization-level. The utilization level of the new Tier B is a function of the system utilization and utilization of the old Tier A. In these embodiments, a utilization monitor component monitors each tier's utilization. The utilization monitor detects when the utilization of Tier B needs to be adjusted and is responsible for moving data (preferably cold data) from Tier B to Tier A.

(7) In the certain embodiments, the wear level of each drive is sampled, and an average wear level is calculated for each tier. Once the wear level difference between Tier A and Tier B is below a predefined threshold, the certain embodiment merge both tiers into one tier (e.g., UBERS are created to include both old drives and new drives).

(8) During the merging operation, some embodiments extend the RAID width (e.g., more drives per UBER), and therefore gain additional capacity, as less storage is used for parity.

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document. Such modifications and enhancements are intended to belong to various embodiments of the disclosure.

What is claimed is:

1. A method of managing storage devices, the method comprising:
generating a wear imbalance level indicating a variance between a first wear level of a first set of storage devices and a second wear level of a second set of storage devices, the first set of storage devices being different from the second set of storage devices;
after generating the wear imbalance level, performing a comparison operation that compares the wear imbalance level to a predefined imbalance threshold, a result of the comparison operation indicating that the wear imbalance level is above the predefined imbalance threshold; and
in response to the result of the comparison operation indicating that the wear imbalance level is above the predefined imbalance threshold, providing the first set of storage devices as a first storage tier and the second set of storage devices as a second storage tier.

2. The method of claim 1, further comprising:
in response to the first wear level of the first set of storage devices being higher than the second wear level of the second set of storage devices, directing write data to the second storage tier to manage wear leveling between the first set of storage devices and the second set of storage devices.

3. The method of claim 2, further comprising:
in response to a write rate to the second storage tier reaching a predefined write bandwidth threshold, directing at least a portion of additional write data to the first storage tier to provide additional write bandwidth when writing to the storage devices.

4. The method of claim 2, further comprising:
performing garbage collection that consolidates valid data stored in the second set of storage devices; and
in response to efficiency of the garbage collection falling below a predefined efficiency threshold, moving data from the second storage tier to the first storage tier to provide additional storage space in the second storage tier.

5. The method of claim 1 wherein the first set of storage devices is configured as a first redundant array of independent disks (RAID);
wherein the method further comprises:
receiving a signal indicating that the second set of storage devices includes a number of storage devices greater than or equal to a predefined minimum RAID-width threshold; and
wherein providing the second set of storage devices as the second storage tier includes:
in response to receiving the signal indicating that the second set of storage devices includes a number of storage devices greater than or equal to a predefined minimum RAID-width threshold, configuring the second set of storage devices as a second RAID.

6. The method of claim 1, further comprising:
in response to the wear imbalance level falling below a predefined merging threshold, merging the first storage tier and the second storage tier by providing both the first set of storage devices and the second set of storage devices as a single storage tier.

7. The method of claim 6 wherein merging the first storage tier and the second storage tier includes:
performing a striping operation that forms RAID stripes from storage devices of both the first set of storage devices and the second set of storage devices.

8. The method of claim 7 wherein performing the striping operation includes:
provisioning the RAID stripes to have respective RAID widths larger than both a first number of storage devices in the first set of storage devices and a second number of storage devices in the second set of storage devices.

9. The method of claim 1 wherein generating the wear imbalance level includes:

providing the first wear level by averaging first proportions of respective numbers of consumed program/erase (P/E) cycles of the first set of storage devices to respective total estimated numbers of P/E cycles of the first set of storage devices;

providing the second wear level by averaging second proportions of respective numbers of consumed P/E cycles of the second set of storage devices to respective total estimated numbers of P/E cycles of the second set of storage devices; and providing, as the wear imbalance level, a difference between the first wear level and the second wear level.

10. The method of claim 1, further comprising:

while operating the first set of storage devices, receiving an expansion instruction to utilize the second set of storage devices;

wherein providing the first set of storage devices as the first storage tier and the second set of storage devices as the second storage tier includes:

configuring the second set of storage devices to provide storage space to perform data storage operations together with the first set of storage devices.

11. An electronic environment, comprising:

a first set of storage devices and a second set of storage devices, the first set of storage devices being different from the second set of storage devices;

memory; and control circuitry coupled with the memory, the memory storing instructions that, when carried out by the control circuitry, cause the control circuitry to perform a method of managing storage devices, the method including:

generating a wear imbalance level indicating a variance between a first wear level of the first set of storage devices and a second wear level of the second set of storage devices;

after generating the wear imbalance level, performing a comparison operation that compares the wear imbalance level to a predefined imbalance threshold; and in response to a result of the comparison operation indicating that the wear imbalance level is above the predefined imbalance threshold, providing the first set of storage devices as a first storage tier and the second set of storage devices as a second storage tier.

12. The electronic environment of claim 11 wherein the method further includes:

in response to the first wear level of the first set of storage devices being higher than the second wear level of the second set of storage devices, directing write data to the second storage tier to manage wear leveling between the first set of storage devices and the second set of storage devices.

13. The electronic environment of claim 12 wherein the method further includes:

in response to a write rate to the second storage tier reaching a predefined write bandwidth threshold, directing at least a portion of additional write data to the first storage tier to provide additional write bandwidth when writing to the storage devices.

14. The electronic environment of claim 12 wherein the method further includes:

performing garbage collection that consolidates valid data stored in the second set of storage devices; and in response to efficiency of the garbage collection falling below a predefined efficiency threshold, moving data from the second storage tier to the first storage tier to provide additional storage space in the second storage tier.

15. The electronic environment of claim 11 wherein the first set of storage devices is configured as a first redundant array of independent disks (RAID);

wherein the method further includes:

receiving a signal indicating that the second set of storage devices includes a number of storage devices greater than or equal to a predefined minimum RAID-width threshold; and wherein providing the second set of storage devices as the second storage tier includes:

in response to receiving the signal indicating that the second set of storage devices includes a number of storage devices greater than or equal to a predefined minimum RAID-width threshold, configuring the second set of storage devices as a second RAID.

16. The electronic environment of claim 11 wherein the method further includes:

in response to the wear imbalance level falling below a predefined merging threshold, merging the first storage tier and the second storage tier by providing both the first set of storage devices and the second set of storage devices as a single storage tier.

17. The electronic environment of claim 16 wherein merging the first storage tier and the second storage tier includes:

performing a striping operation that forms RAID stripes from storage devices of both the first set of storage devices and the second set of storage devices.

18. The electronic environment of claim 17 wherein performing the striping operation includes:

provisioning the RAID stripes to have respective RAID widths larger than both a first number of storage devices in the first set of storage devices and a second number of storage devices in the second set of storage devices.

19. A computer program product having a non-transitory computer readable medium that stores a set of instructions to manage storage devices, the set of instructions, when carried out by computerized circuitry, causes the computerized circuitry to perform a method of:

generating a wear imbalance level indicating a variance between a first wear level of a first set of storage devices and a second wear level of a second set of storage devices, the first set of storage devices being different from the second set of storage devices;

after generating the wear imbalance level, performing a comparison operation that compares the wear imbalance level to a predefined imbalance threshold; and in response to a result of the comparison operation indicating that the wear imbalance level is above the predefined imbalance threshold, providing the first set of storage devices as a first storage tier and the second set of storage devices as a second storage tier.

* * * * *